United States Patent [19]
Behnert

[11] 3,841,562
[45] Oct. 15, 1974

[54] VARIABLE NOZZLE FOR POSITION CONTROL

[75] Inventor: Reinhard Behnert, Osterhagen-Ihlpohl, Germany

[73] Assignee: Vereinigte Flugtechnische Werke-Fokker Gesellschaft mit beschrankter Haftung, Bremen, Germany

[22] Filed: Nov. 8, 1973

[21] Appl. No.: 414,157

[30] Foreign Application Priority Data
Nov. 17, 1972 Germany............................ 2256438

[52] U.S. Cl...................... 239/265.29, 239/265.31
[51] Int. Cl. ......................... B64c 9/38, B64c 15/06
[58] Field of Search..... 239/265.19, 265.23, 265.25, 239/265.27, 265.29, 265.31; 181/33 HD

[56] References Cited
UNITED STATES PATENTS

| | | | |
|---|---|---|---|
| 2,788,635 | 4/1957 | Ford .............................. | 239/265.19 |
| 2,995,894 | 8/1961 | Baxter et al. ................... | 239/265.27 |
| 3,024,062 | 3/1962 | Bertin et al. ................ | 239/265.27 X |
| 3,581,995 | 6/1971 | Fischer ........................... | 239/265.19 |

Primary Examiner—Robert S. Ward, Jr.
Attorney, Agent, or Firm—Ralf H. Siegemund

[57] ABSTRACT

The nozzle has a chamber with one or two openings extending at right angles to a feeder pipe opening as terminating in the chamber. A deflector plate or baffle with variable tilting controls the effective opening of the nozzle as to cross-section of flow from the pipe through the opening for production of thrust. Direction control of flow as against the spring biased baffle determines the tilt angle of the baffle and that in turn determines the effective nozzle opening.

9 Claims, 7 Drawing Figures

PATENTED OCT 15 1974    3,841,562

VARIABLE NOZZLE FOR POSITION CONTROL

BACKGROUND OF THE INVENTION

The present invention relates to a control nozzle with means for changing the effective opening thereof. More particularly the invention relates to a control nozzle for position and/or attitude control of an aircraft using a pressurized medium, such as air or exhaust gas, for producing a control thrust in a predetermined direction.

Aircrafts, space vehicles or the like are, for example, stabilized as to their position by using a control nozzle ejecting a medium under pressure as a control jet. This jet produces a thrust component which acts on a lever arm and tends to turn the craft on an axis (e.g. pitch, yaw or roll axis). The nozzle should be controlled with very little actuation force while the thrust produced should be quite large. Such an inherent high gain poses difficulties as far as feeding of gas to the nozzle and sealing of flow for avoiding leakage is concerned. Moreover, the reliability of such a nozzle is tested again and again under extreme conditions.

The particularly known nozzles constructed for meeting these requirements and conditions include a valve slide in a nozzle chamber for varying the effective opening of the nozzle in the exit plane. Since relatively large surfaces have to be guided relative to each other in a superimposing relation, sealing requires extreme accuracy of the employed parts. Uneven heating of sliding parts, cooling thereof and a large flow of the thrust producing medium pose significant problems here. If such a control nozzle is an actuating member in an automatic feedback control system it is additionally desirable to have a linear thrust characteristic.

These various conditions are in some instances opposing constraints, and as a consequence the control nozzles which have been constructed in the past are quite complicated and expensive.

SUMMARY OF THE INVENTION

It is an object of the present invention to provide for a control nozzle with variable effective opening in the exit plane and being constructed in a rather simple manner, remains reliable and is easy to service. Moreover, the nozzle should be constructed to permit ready changes to meet additional demands which may be made later.

In accordance with the preferred embodiment of the invention it is suggested to provide a pressure pipe as feed pipe for and into a nozzle chamber, whereby the exit plane of the pipe has an angle to the exit plane of the nozzle. A flow deflection plate or baffle is pivotably disposed in that chamber, the pivot axis extending transversely to the pipe, and the pivoting edge of that plate has variable disposition in the range of the nozzle exit plane to thereby control the effective opening. Therefore, the nozzle exit opening is not controlled as to aperture size as such, but the pivotable deflector plate acts as variable position barrier and redirects the flow of the pressurized medium while blocking laterally a part, all or none of the nozzle opening.

In the preferred form of practicing the invention, the nozzle chamber has two oppositely directed nozzle openings and the resultant thrust produced is the difference in the subtractively effective two thrust components. The deflection plate either equalizes the two component thrusts for a resultant thrust of zero, or imbalances the two component thrusts to obtain a non-zero control thrust as resultant. The dispostion of the deflection plate can be controlled dynamically by means of direction control of flow towards and against the plate to obtain e.g. tilting. Alternatively, the plate may be tilted and held by mechanical linkage or the like.

The deflection plate is preferably spring biased and the bias may be selected to effectively block passage of fluid between the pipe and the nozzle opening or openings. A minimum pressure is required here to lift the plate off the closing position or a mechanical device.

The deflection plate may be supported for tilting on a bearing block which is mounted on a removable cover for the nozzle chamber to obtain easy access to the interior of the apparatus. In the case of spring bias, the spring is part of the cover assembly. Differently constructed covers may be used here for cooperation with a basic nozzle chamber - feed pipe assembly.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIGS. 1 and 2 show a pressure pipe 2 with an exit opening 3 at one end constructed as a constricting passage for limiting maximum through-flow. A casing 10 defining a nozzle chamber 1 is flanged to pipe 2. The nozzle chamber has two exit openings 8 and 8' which are located opposite to each other, and each opening extends in a plane at a right angle to the plane of the exit opening 3 of pipe 2.

Figure 1:
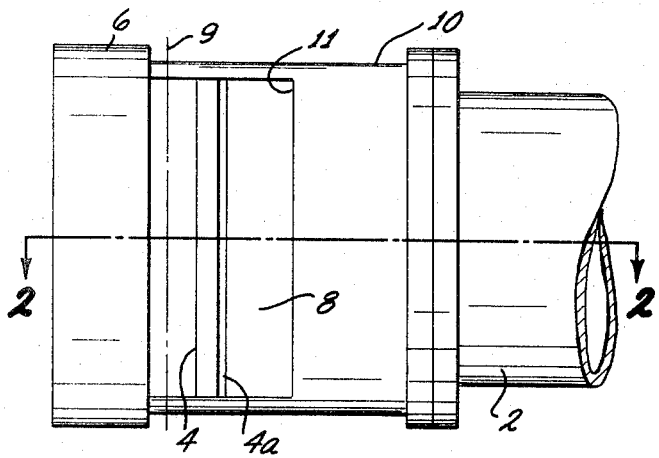
FIG. 1 is a side elevation of a control nozzle constructed in accordance with the preferred embodiment of the invention.

The casing 10 of the nozzle chamber is of rectangular configuration in cross-section to which is bolted a cover 6. A bearing block 5 is mounted on cover 6 and projects into the interior of chamber 1. A shaft 9 is mounted (or journalled) to block 5 for journalling and pivotally mounting a deflection plate or baffle 4. The plate 4 has edges 4a and 4a' which respectively extend to the exits 8,8'. These exit openings are limited by edges 11 and 11' so that the effective aperture width or opening of each exit is defined by the distances between plate edges 4a, 4a' on the one hand and edges 11, 11' on the other hand.

Disregarding for the moment any pressure in chamber 1, a spring 12 balances plate 4 into a position of symmetry, with similar effecive nozzle openings. The spring bears against cover 6 and constitutes a part of the cover-mounting block-plate assembly which can be removed and exchanged from the nozzle casing 10.

A profile bar 7 is pivotally mounted symmetrically to and on the axis of pipe 2 as well as to shaft 9, whereby particularly the pivot axis 7' of bar 7 runs parallel to the axis of shaft 9, both axes running transversely to the axis of pipe 2. The bar 7 has aerodynamic profile, and in dependance upon its orientation it directs the flow of the active, pressurized medium which passes through pipe 2, towards plate 4 at an angle.

In the illustrated position of profile bar 7, the flow through and from pipe 2 is symmetrically distributed and deflected by plate 4 in similar positions up and down for flow through the portions of openings 8 and 8' which extend between the edges 4a, 4a' and 11, 11'. The quantities of flow are similar so that the thrusts produced by fluid ejection through these openings are oppositely directed and equal in magnitude, and the resultant thrust is zero.

Upon deflecting bar 7, flow from pipe 2 is redirected and the asymmetry unbalances the pressure on baffle or plate 4 to the two sides from the pivot axis 9 so that the plate pivots and tilts until the spring 12 establishes a new equilibrium position. As a consequence, the operative openings 8, 8' are no longer equal, and the two oppositely directed thrusts no longer cancel. Thus, an operative thrust resultant in one or the other direction is produced by pivoting the profile bar on its axis, clockwise or counterclockwise. The effective nozzle openings are then established by fluid dynamical tilting of the deflection plate.

Figure 5A:
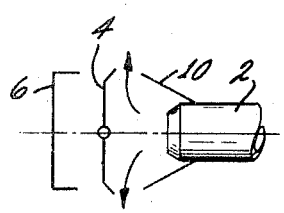
FIG. 5 is a three part (a, b, c) schematic representation of operating positions of the nozzle of FIG. 1, including the possibility of no spring bias.
Figure 5B:
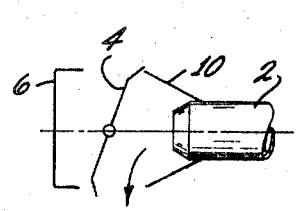
Figure 5C:
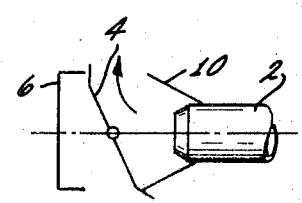

Without spring, or for a spring 10 offering little resistance, the operation may be as depicted schemicatically in FIG. 5a, 5b, and 5c. FIG. 5a shows again the equilibrium position when the flow from pipe 2 hits the plate symmetrically. Deflection in one direction may tilt the plate 4 to close e.g. the upper nozzle opening 8, and the entire flow from pipe 2 is deflected through opening 8'. As a consequence, full control thrust is available and in clockwise direction in relation to an axis to the right of the nozzle and transverse to the axis of pipe 2. FIG. 5c shows development of control thrust in counterclockwise direction.

It can readily be seen that the operative deflection of plate 4 is the result of spring resiliency, pressure of the thrust producing medium, and angle of attack of the profile bar 7. For a stronger spring, intermediate positions of nozzle openings are readily available for a finer metering of the resultant control thrust as imbalance between a thrust component for clockwise action and a component for counterclockwise action.

FIGS. 5 also readily show that the same operation is possible without balancing spring as well as without profile bar 7. The deflection plate itself may be position controlled hydraulically and/or through suitable linkage capable of holding the deflection plate in any desired position between full closing of the other nozzle opening.

Figure 3:
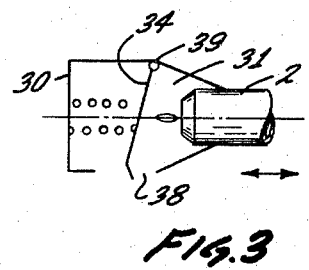
FIG. 3 is a schematic view of a somewhat simplified example of the invention.

FIG. 3 shows a modified construction for a single direction nozzle 30. A hinge or pivot point 39 for a deflection plate 34 is located on one side of the nozzle chamber 31 which is completely closed at the location corresponding to opening 8 in FIG. 1 and 2; the nozzle chamber in this example has a single opening, 38. A spring 35 may bias the plate 34 normally to a fully closed passage for flow between pipe 2 and opening 38. The direction of the profile bar 7 determines the direction of flow against plate 34 and that, in turn, determines the deflection which in turn determines the operative and effective area of the nozzle opening. In lieu of bar 7, plate 34 may be deflected by means of linkage acting directly on plate 34 or otherwise.

Figure 2:
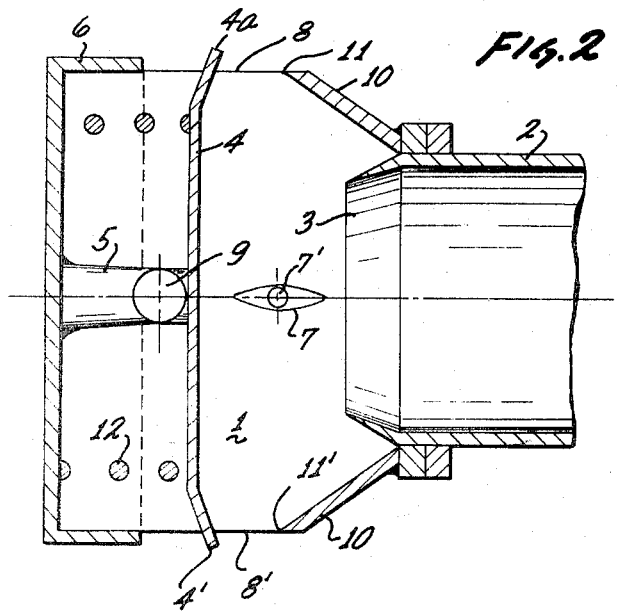
FIG. 2 is a section view along line II—II in FIG. 1.
Figure 4:
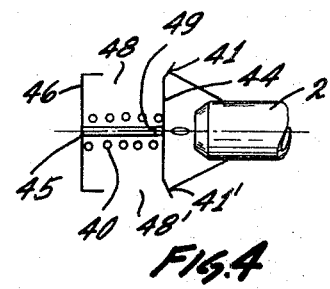
FIG. 4 is a schematic view of a modification of the construction of FIG. 1.

The embodiment of FIG. 4 is similar in many respects to FIGS. 1 and 2 except that the pivot axis 49 of the deflection plate 44 is longitudinally movable toward and away from pipe 2 in appropriately constructed bearing and mounting block 45. The block 45 may have slots in which the shaft 49 can slide for positioning of plate 44 by action and reaction of a spring 40. Spring 40 biases normally plate 44 away from a cover 46 and into abutment with edges 41, 41' of the nozzle openings 48, 48' so that the passage of fluid between pipe 2 and openings 48 and 48' is blocked.

The nozzles remain closed in that fashion as long as the pressure P. in pipe 2 remains below a predetermined limit. That limit is determined by the resilient reaction force of spring 40. Only after this internal pressure has been exceeded, plate 44 will lift off the edges 41, 41' and the particular pressure will establish a new balance of positioning plate 44 in dependance upon the reaction of the compressed spring. That, in turn, establishes the opening for the nozzles.

With profile bar 7 in neutral position, both nozzle openings 48 and 48' are opened to the same degree. A deflection of bar 7 redirects the flow and unbalances the position of plate 44 to obtain a resultant thrust in one or the other direction. The effective thrust producing nozzle opening is still determined by the operating pressure of the pressurized fluid as passing from pipe 2.

One can readily see that the basic construction of the nozzle permits employment of different kinds of operating principles. Strength of the spring and fixed or variable position pivot mount for the deflection plate are variable parameters requiring different kinds of construction on the cover, but using similar nozzle chambers, pipes and deflection plates. A nozzle with permanently thrust producing operation will be used when the medium is, for example, exhaust gas, i.e., does not have to be produced separately. In the latter case, greater economy is in order and one will chose the construction with slidable spring biased deflection plate capable of completely closing the nozzle openings. Also, frequency of operation of the control nozzle has an influence on the chosen construction.

The invention is not limited to the embodiments described above but all changes and modifications thereof not constituting departures from the spirit and scope of the invention are intended to be included.

I claim:

1. Control nozzle with variable opening comprising:

first means defining a nozzle chamber and having at least one opening in a first particular plane;
a pressure pipe disposed for feeding a pressurized medium into the nozzle chamber and having an end opening in a second plane extending at an angle to the first plane;
a deflection plate pivotally mounted in said chamber and having an edge extending to said opening of the nozzle chamber, said edge determining the effective area of said nozzle opening for flow from said pipe and through the effective area, said deflection plate pivoting on an axis which extends transverse to said pipe; and second means for determining the deflective position of said plate.

2. Control nozzle as in claim 1 wherein said nozzle chamber has two openings, including said one opening, the other opening being located in a plane parallel to said first plane, said plate having two edges, including said one edge, for respectively determining the effective areas of said nozzle openings, and in dependance upon the delfection angle of said plate and in opposite sense as to the two nozzle openings.

3. Control nozzle as in claim 2 the second means including flow directing means for varying the direction of flow from the pipe towards and against the plate.

4. Control nozzle as in claim 3, said plate being spring biased.

5. Control nozzle as in claim 1 and including means for blocking completely passage of fluid from the pipe to the opening.

6. Control nozzle as in claim 5, the means for blocking including a spring, pressure in the pipe must exceed a predetermined value to displace the plate against the force of the spring.

7. Control nozzle as in claim 1, the first means including a cover, the deflection plate being pivotally mounted on said cover.

8. Control nozzle as in claim 7, the deflection plate being pivotally and slidably mounted on said cover, there being a spring for pivotally mounting and shifting the plate towards the pipe.

9. Control nozzle as in claim 1 the second means including flow directing means for varying the direction of flow from the pipe towards and against the plate.

* * * * *